(12) United States Patent
Seto

(10) Patent No.: US 8,418,552 B2
(45) Date of Patent: Apr. 16, 2013

(54) ABSOLUTE DISPLACEMENT DETECTION METHOD AND ABSOLUTE DISPLACEMENT SENSOR USING THE METHOD

(75) Inventor: Kazuto Seto, Kanagawa (JP)

(73) Assignees: Kazuto Seto, Kanagawa (JP); Oiles Corporation, Tokyo (JP)

( * ) Notice: Subject to any disclaimer, the term of this patent is extended or adjusted under 35 U.S.C. 154(b) by 281 days.

(21) Appl. No.: 12/672,115

(22) PCT Filed: Aug. 5, 2008

(86) PCT No.: PCT/JP2008/002120
§ 371 (c)(1),
(2), (4) Date: Feb. 4, 2010

(87) PCT Pub. No.: WO2009/019863
PCT Pub. Date: Feb. 12, 2009

(65) Prior Publication Data
US 2011/0203377 A1    Aug. 25, 2011

(30) Foreign Application Priority Data
Aug. 6, 2007 (JP) .................................. 2007-204782

(51) Int. Cl.
*G01P 15/00*    (2006.01)

(52) U.S. Cl.
USPC .................................. 73/490; 73/649; 73/652

(58) Field of Classification Search .................. None
See application file for complete search history.

(56) References Cited

U.S. PATENT DOCUMENTS 6,510,738 B1 *    1/2003 Lee et al. .................. 73/579

FOREIGN PATENT DOCUMENTS

| JP | 1-136033 | 5/1989 |
| JP | 2003-130628 | 5/2003 |
| JP | 2003-130629 | 5/2003 |
| JP | 2004-251666 | 9/2004 |

OTHER PUBLICATIONS

English Machine translation of document JP 2004-251666.*
International Search Report for PCT/JP2008/002120, mailed Nov. 4, 2008.
Microfilm of the specification and drawings annexed to the request of Japanese Utility Model Application No. 21098/1989, Sep. 10, 1990.

* cited by examiner

*Primary Examiner* — Hezron E Williams
*Assistant Examiner* — Mark A Shabman
(74) *Attorney, Agent, or Firm* — Nixon & Vanderhye P.C.

(57) ABSTRACT

An absolute displacement sensor 1 includes a sensor housing 2 serving as a detection object; a mass body 3 having a mass m which is movably supported by the sensor housing 2 with a spring coefficient k and a damping coefficient c; a detecting means 4 which electrically detects a relative velocity of the sensor housing 2 with respect to the mass body 3; a feedback control means 5 which controls the absolute displacement of the mass body 3 attributable to the absolute displacement of the sensor housing 2 by positively feeding back the relative displacement and by negatively feeding back a relative acceleration obtained by primarily differentiating the relative velocity, respectively; and a phase lag compensation means 6 which performs phase lag compensation with respect to the relative displacement.

5 Claims, 4 Drawing Sheets

ABSOLUTE DISPLACEMENT DETECTION METHOD AND ABSOLUTE DISPLACEMENT SENSOR USING THE METHOD

This application is the U.S. national phase of International Application No. PCT/JP2008/002120, filed 5 Aug. 2008, which designated the U.S. and claims priority to Japanese Patent Application No. 2007-204782, filed 6 Aug. 2007, the entire contents of each of which are hereby incorporated by reference.

TECHNICAL FIELD

The present invention relates to an absolute displacement detection method for detecting the absolute displacement of a vibrating body (detection object) necessary for observation and/or vibration control of such as the vibration of machines attributable to metal working machines, compressors, and the like which are used in factories, business establishments, construction sites, etc., the vibration of buildings and machinery due to such as the vibration of the ground and road surfaces attributable to earthquakes, vehicle travel, and the like, and the vibration of skyscraper buildings due to vortex-induced vibrations caused by wind or due to earthquakes, as well as an absolute displacement sensor using that method.

BACKGROUND ART

[Patent Document 1] JP-A-2003-130628

In recent years, vibration problems have occurred in structures such as offices, enterprise buildings, multiple dwelling houses, and conventional homes due to vibrations attributable to metal working machines, compressors, and the like which are used in factories, business establishments, and construction sites, or due to such as the vibration of the ground and road surfaces attributable to earthquakes or vehicle travel. As a vibration control measure for such a conventional home or the like, it is conceivable to use active dynamic vibration absorber using active control. In ideal active control, however, it is necessary to detect such as the absolute displacement and the absolute velocity of the structure as a controlled object, i.e., a vibrating body (detection object), in a case where it is subjected to vibration. In that detection, a seismic-type displacement sensor (hereinafter referred to as the displacement sensor) which is directly attached to the controlled object is suitable.

DISCLOSURE OF THE INVENTION

Problems that the Invention is to Solve

Incidentally, as a result of the fact that three-storied conventional homes and the like, shifting from two-storied ones, are on the increase in conjunction with the effective utilization of land and the improvement of building technology, the natural frequency of such a structure has declined to such as the vicinity of 3 Hz. However, since the detectable range of the displacement sensor is higher than the natural frequency of itself, the detection of the absolute displacement, absolute velocity, and the like of the structure having a natural frequency lower than the natural frequency of the displacement sensor itself is difficult with the conventional displacement sensor.

To lower the natural frequency of the displacement sensor, it suffices if the mass of a mass body in the displacement sensor is made large, and the mass body is supported with low rigidity. However, with such a means, there is a possibility that the displacement sensor becomes large in size and becomes structurally fragile. In addition, a displacement sensor whose detectable amplitude is small is limited in its intended use and therefore does not offer much convenience.

Accordingly, an absolute displacement sensor using a feedback technique is proposed in Patent Document 1.

According to the absolute displacement sensor proposed in Patent Document 1, it is possible to satisfactorily solve the above-described problems, lower the natural frequency, and expand the detectable range. Hence, it is possible to satisfactorily detect the absolute velocity and the absolute displacement not only in a structure with a high natural frequency and in the case where the structure vibrates with a small amplitude but also in a structure with a low natural frequency and in the case where the structure vibrates with a large amplitude.

However, with the absolute displacement sensor of Patent Document 1 using the feedback technique, in order to make detectable down to a further extremely low frequency such as the oscillation of a skyscraper building, there are problems in that difficult adjustment is required for the positive feedback of the relative displacement, and that the absolute displacement sensor is likely to lapse into control instability due to unintended variations after the adjustment.

The present invention has been devised in view of the above-described aspects, and its object is to provide an absolute displacement detection method which is capable of lowering the natural frequency and enlarging the detectable amplitude without causing a structural defect by feeding back state quantities (displacement, velocity, and acceleration) possessed by the mass body, thereby making it possible to satisfactorily detect the absolute displacement not only in a structure with a high natural frequency and in the case where the structure vibrates with a small amplitude but also in a structure with a low natural frequency and in the case where the structure vibrates with a large amplitude, and making it possible to expand the detection range down to an extremely low frequency and stably detect the absolute displacement without requiring difficult adjustment of the positive feedback of the relative displacement, as well as an absolute displacement sensor using the method.

Means for Solving the Problems

An absolute displacement detection method in accordance with the present invention comprises the steps of: detecting a relative velocity of a detection object with respect to a mass body supported by the detection object with a predetermined spring coefficient and a predetermined damping coefficient; controlling the displacement of the mass body attributable to an absolute displacement of the detection object by positively feeding back a relative displacement obtained by integrating the detected relative velocity and by negatively feeding back a relative acceleration obtained by primarily differentiating the detected relative velocity, respectively; and obtaining the absolute displacement of the detection object from a relative displacement in which the relative displacement obtained by the integration is subjected to phase lag compensation in a required frequency region.

An absolute displacement sensor in accordance with the invention comprises: a mass body which is supported by a detection object with a predetermined spring coefficient and a predetermined damping coefficient; detecting means which detects a relative velocity of the detection object with respect to the mass body; feedback control means which controls a displacement of the mass body attributable to an absolute displacement of the detection object by positively feeding back a relative displacement obtained by integrating the detected relative velocity and by negatively feeding back a relative acceleration obtained by primarily differentiating the detected relative velocity, respectively; and phase lag compensation means which performs phase lag compensation in a required frequency region with respect to the relative displacement obtained by the integration, wherein the relative displacement subjected to the phase lag compensation by the phase lag compensation means is outputted as the absolute displacement of the detection object.

In the absolute displacement detection method in accordance with the invention, the displacement of the mass body attributable to the absolute displacement of the detection object may be controlled by negatively or positively feeding back the detected relative velocity. In addition, in the absolute displacement sensor in accordance with the invention, the feedback control means may be adapted to control the displacement of the mass body attributable to the absolute displacement of the detection object by further negatively or positively feeding back the detected relative velocity.

In the present invention, the detection of the absolute displacement is difficult unless the frequency is higher than the natural frequency of the displacement sensor itself, and although if the natural frequency possessed by the displacement sensor can be lowered, the detection range can be expanded to enable the detection of even a low frequency, even if the mass of the mass body is merely increased and the spring coefficient of the spring supporting the mass body is made small to lower the natural frequency, there is a possibility that the displacement sensor becomes large in size and becomes structurally fragile. In the light of these facts, state quantities of the mass body are fed back by using servo technology, and the relative displacement obtained by using such servo technology is subjected to phase lag compensation to thereby lower the natural frequency.

With the absolute displacement detection method and the absolute displacement sensor in the present invention, the displacement of the mass body attributable to the absolute displacement of the detection object is controlled by positively feeding back the relative displacement obtained by integrating the detected relative velocity and by negatively feeding back the relative acceleration obtained by primarily differentiating the detected relative velocity. Therefore, it is possible to lower the natural frequency, as will be described hereinunder. Thus, it is possible to satisfactorily detect the absolute displacement not only in a structure whose natural frequency is high but also in a structure whose natural frequency is low.

In addition, with the absolute displacement detection method and the absolute displacement sensor in the present invention, since phase lag compensation is performed on the relative displacement obtained by the integration in a required frequency region outside a feedback loop, it is possible to expand the detection range down to an extremely low frequency, as will be described hereinunder, even if adjustment of the positive feedback of the relative displacement, which is likely to lapse into control instability, is not carried out. Specifically, with the absolute displacement detection method and the absolute displacement sensor in the present invention, the phase advances at the natural frequency or lower in the feedback loop; therefore, if phase lag compensation is performed at a required frequency region so that the advance of the phase becomes zero in the detection range, the detection range can be expanded down to an extremely low frequency.

In addition, with the absolute displacement detection method and the absolute displacement sensor in the present invention, since the displacement of the mass body attributable to the absolute displacement of the detection object is controlled by negatively feeding back the detected relative velocity, the damping ratio can be made large, as will be described hereinunder.

According to the present invention, it is possible to provide an active dynamic vibration absorber which is adapted to absorb vibrations of a vibrating body on the basis of the absolute displacement which is outputted from the absolute displacement sensor according to any one of the above-described aspects.

Advantages of the Invention

According to the present invention, it is possible to provide an absolute displacement detection method which is capable of lowering the natural frequency and enlarging the detectable amplitude without causing a structural defect by feeding back state quantities (displacement, velocity, and acceleration) possessed by the mass body, thereby making it possible to satisfactorily detect the absolute displacement not only in a structure with a high natural frequency and in the case where the structure vibrates with a small amplitude but also in a structure with a low natural frequency and in the case where the structure vibrates with a large amplitude, and making it possible to expand the detection range down to an extremely low frequency and stably detect the absolute displacement without requiring difficult adjustment of the positive feedback of the relative displacement, as well as an absolute displacement sensor using the method.

Next, a more detailed description will be given of the mode for carrying out the invention with reference to a preferred embodiment illustrated in the drawings. It should be noted that the invention is not limited to such an embodiment.

BEST MODE FOR CARRYING OUT THE INVENTION

Figure 1:
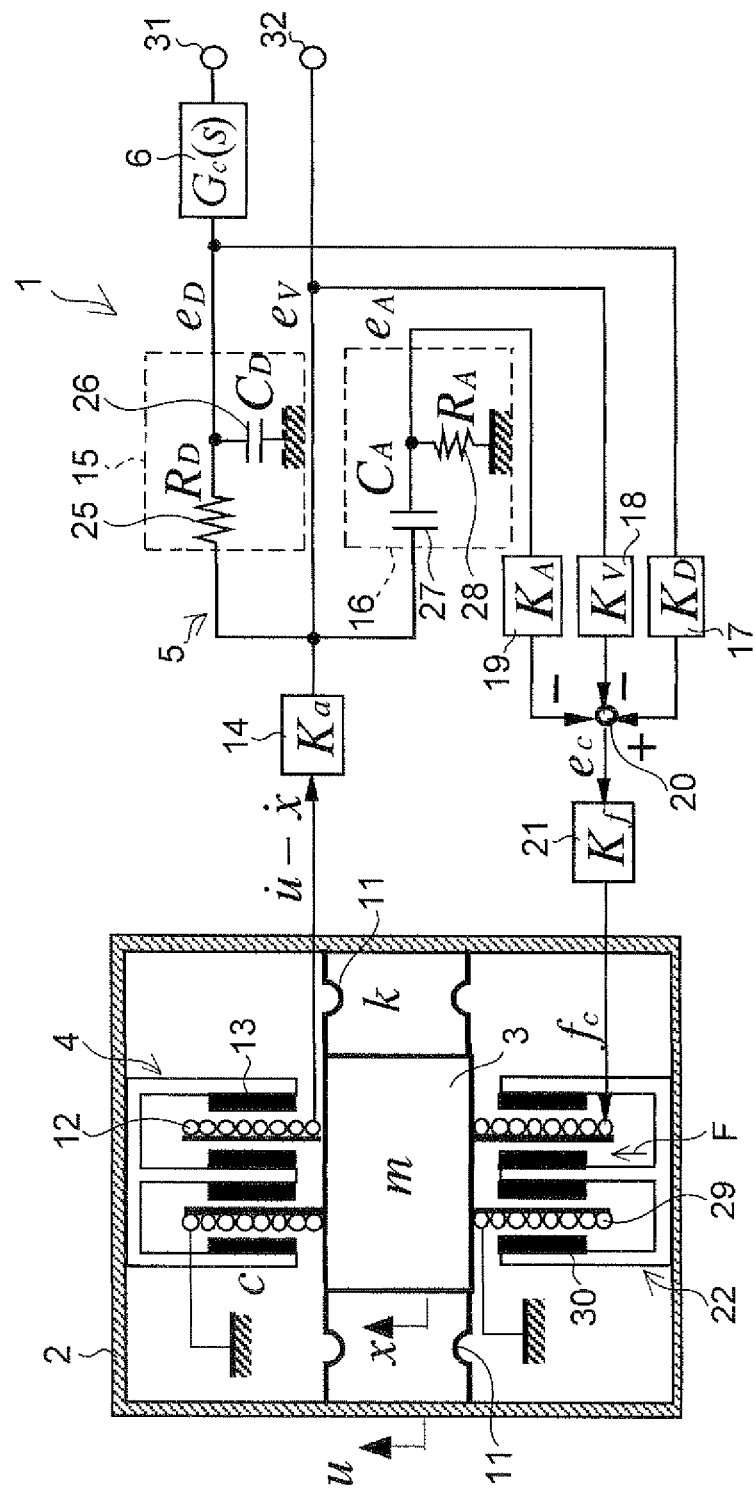
FIG. 1 is an explanatory diagram of a referred embodiment of the invention.

In FIG. 1, an absolute displacement sensor 1 in accordance with this embodiment is comprised of a sensor housing 2 serving as a detection object; a mass body 3 having a mass m (kg) which is movably supported by the sensor housing 2 with a spring coefficient k (N/m) and a damping coefficient c (Ns/m); a detecting means 4 which electrically detects a relative velocity v ($=v_u-v_x$) (m/s) of the sensor housing 2 with respect to the mass body 3 (where $v_x$ (m/s) is the absolute velocity of the mass body 3 attributable to the absolute velocity $v_u$ (m/s) of the sensor housing 2); a feedback control means 5 which controls the absolute displacement x of the mass body 3 attributable to the absolute displacement u of the sensor housing 2 by positively feeding back a relative displacement (u−x) obtained by integrating the relative velocity v detected by the detecting means 4, by feeding back the detected relative velocity v negatively in this embodiment, and by negatively feeding back a relative acceleration a (m/s$^2$) obtained by primarily differentiating the detected relative velocity v, respectively; and a phase lag compensation means 6 which performs phase lag compensation in a required frequency region with respect to the relative displacement (u−x) obtained by the integration from the feedback control means 5.

The mass body 3 is displaceably (vibratably) supported to the sensor housing 2 by a spring 11 having the spring coefficient k (N/m), and the damping coefficient c with respect to the vibration of such a mass body 3 is determined on the basis of the heat loss in the elastic deformation of the spring 11 per se and the eddy current loss in the detecting means 4.

The detecting means 4 includes a permanent magnet 13 fixed to the sensor housing 2, a coil 12 fixed to the mass body 3 so as to detect the magnetic flux of the permanent magnet 13, and an amplifier 14 which converts a current signal i indicating the relative velocity v from the coil 12 into a relative velocity voltage signal $e_V$ (V) as the relative velocity v with an amplification degree (current-voltage conversion coefficient) Ka (V/A). The coil 12 is adapted to electrically detect the relative velocity v of the sensor housing 2 with respect to the mass body 3 as a change in the magnetic flux of the permanent magnet 13 traversing the coil 12, and the eddy current loss in the electrical detection of the change in the magnetic flux of the permanent magnet 13 due to the coil 12 contributes to the damping coefficient c.

The feedback control means 5 includes an integration circuit 15 which outputs a relative displacement voltage signal $e_D$ (V) as the relative displacement (u−x) by integrating the relative velocity voltage signal $e_V$; a differentiation circuit 16 which outputs a relative acceleration voltage signal $e_A$ (V) as the relative acceleration a by primarily differentiating the relative velocity voltage signal $e_V$; a multiplier 17 which outputs a voltage signal $K_D \cdot e_D$ by multiplying by a displacement feedback gain $K_D$ the relative displacement voltage signal $e_D$ obtained by integrating the relative velocity voltage signal $e_V$; a multiplier 18 which outputs a voltage signal $K_V \cdot e_V$ by multiplying the relative velocity voltage signal $e_V$ by an velocity feedback gain $K_V$; a multiplier 19 which outputs a voltage signal $K_A \cdot e_A$ by multiplying the relative acceleration voltage signal $e_A$ by an acceleration feedback gain $K_A$; an adder-subtractor 20 which outputs an addition-subtraction voltage signal $e_c$ (=$K_D \cdot e_D − K_V \cdot e_V − K_A \cdot e_A$) by performing addition and subtraction of the voltage signals $K_D \cdot e_D$, $K_V \cdot e_V$, and $K_A \cdot e_A$ from the multipliers 17, 18, and 19; a converter 21 which converts the addition-subtraction voltage signal $e_c$ into a current signal $f_c$ with a conversion feedback gain $K_f$ (A/V); and an electromagnetic actuator 22 which operates by using the current signal $f_c$ from the converter 21 as a coil drive current.

The integration circuit 15 consists of a resistor 25 having a resistance value $R_D$ (Ω) and a capacitor 26 having an electrostatic capacity $C_D$ (F), and the differentiation circuit 16 consists of a capacitor 27 having an electrostatic capacity $C_A$ (F) and a resistor 28 having a resistance value $R_A$ (Ω).

The electromagnetic actuator 22 serving as an actuator consists of a coil 29 fixed to the mass body 3 and a permanent magnet 30 secured to the sensor housing 2 and generates a driving force F (N) by a current (A) inputted to the coil 29 on the basis of the current signal $f_c$. The electromagnetic actuator 22 is adapted to generate the driving force F with respect to the inputted current and to impart the driving force F to the coil 29 relative to the mass body 3 so as to displace the mass body 3 relative to the sensor housing 2. It is assumed that a conversion gain for the driving force F with respect to the current signal $f_c$ is included in the conversion feedback gain $K_f$.

Figure 2:
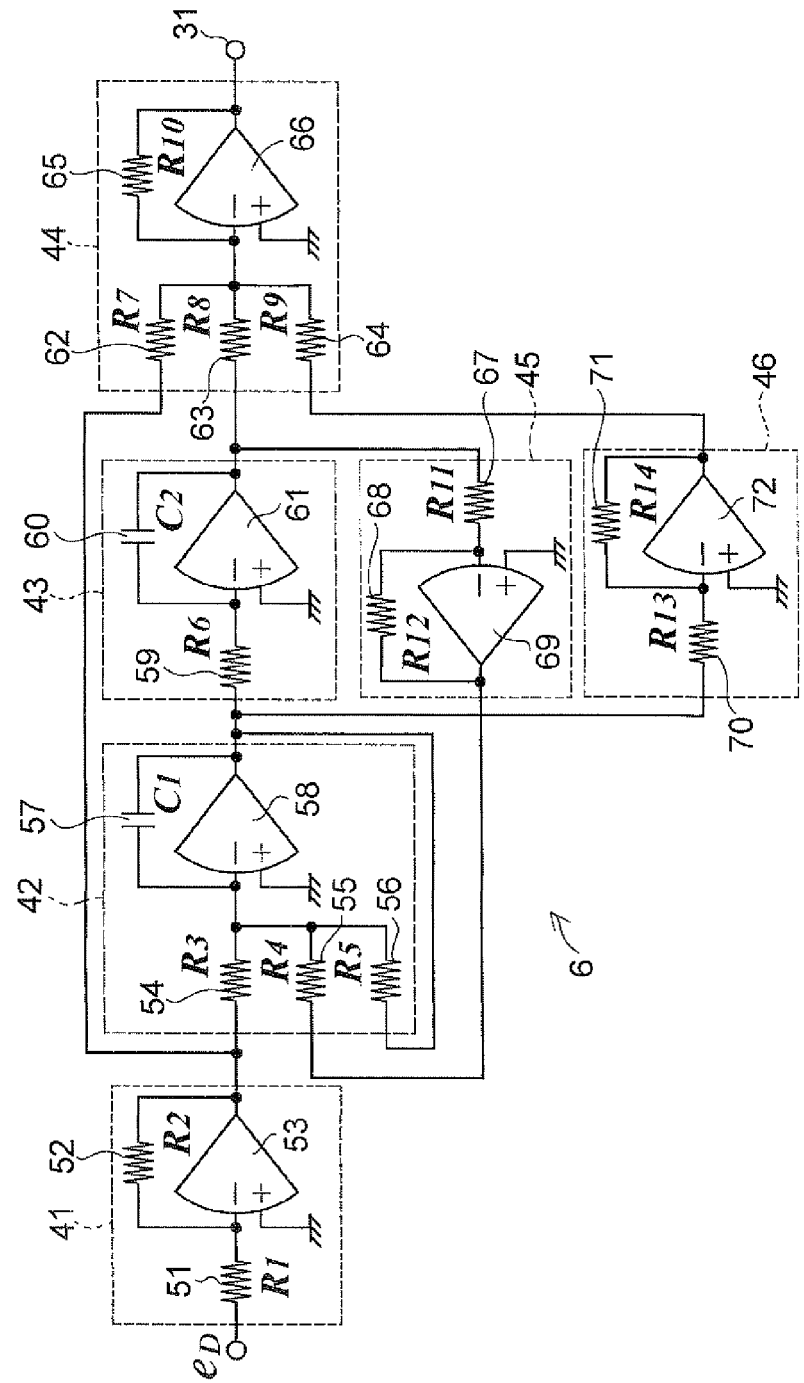
FIG. 2 is an explanatory diagram of a phase lag compensation means of the embodiment shown in FIG. 1.

As shown in FIG. 2, the phase lag compensation means 6 has an inverter 41, an integrator 42, an integrator 43, an adder 44, an inverter 45, and an inverter 46. The inverter 41 which inverts the relative displacement voltage signal $e_D$ inputted thereto consists of resistors 51 and 52 respectively having resistance values $R_1$ and $R_2$ (Ω) and an operational amplifier 53. The integrator 42 which integrates output signals inputted thereto from the inverters 41 and 45 consists of resistors 54, 55, and 56 respectively having resistance values $R_3$, $R_4$, and $R_5$ (Ω), a capacitor 57 having an electrostatic capacity $C_1$ (F), and an operational amplifier 58. The integrator 43 which integrates an output signal inputted thereto from the integrator 42 consists of a resistor 59 having a resistance value $R_6$ (Ω), a capacitor 60 having an electrostatic capacity $C_2$ (F), and an operational amplifier 61. The adder 44 which adds output signals inputted thereto from the inverter 41, the integrator 43, and the inverter 46 consists of resistors 62, 63, 64, and 65 respectively having resistance values $R_7$, $R_8$, $R_9$ and $R_{10}$ (Ω) and an operational amplifier 66. The inverter 45 which inverts an output signal inputted thereto from the integrator 43 consists of resistors 67 and 68 respectively having resistance values $R_{11}$ and $R_{12}$ (Ω) and an operational amplifier 69. The inverter 46 which inverts an output signal inputted thereto from the integrator 42 consists of resistors 70 and 71 respectively having resistance values $R_{13}$ and $R_{14}$ (Ω) and an operational amplifier 72.

Figure 3:
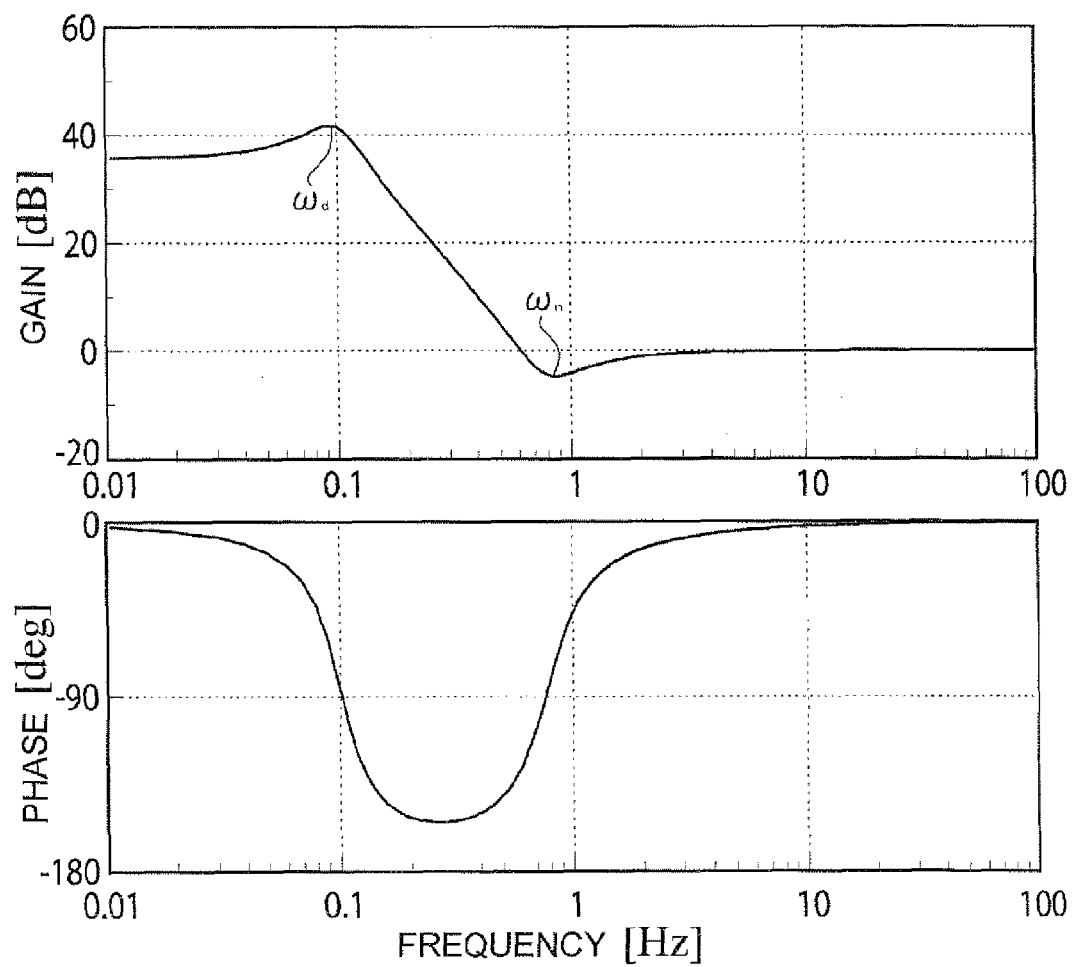
FIG. 3 is an explanatory diagram of frequency characteristics of the phase lag compensation means of the embodiment shown in FIG. 1.

The phase lag compensation means 6 shown in FIG. 2 has a transfer function $G_C(s)$ of a second-order system shown in Expression (1), where $R_1=R_2$, $R_3=1/\omega_d^2$, $R_4 \cdot R_6 \cdot C_1 \cdot C_2 = 1/\omega_d^2$, $R_5 \cdot C_1 = 1/(2 \cdot \zeta_d \cdot \omega_d)$, $R_{10}/R_7 = \omega_d^2/\omega_n^2$, $R_{10}/R_8 = 1 - \omega_d^2/\omega_n^2$, $R_{10}/R_9 = 2 \cdot \zeta_n \cdot (1/\omega_n) - 2 \cdot \zeta_d \cdot (\omega_d/\omega_n^2)$, $R_{11}=R_{12}$, and $R_{13}=R_{14}$, and where $\omega_n=0.9 \cdot (2\pi)$ (rad/s), $\zeta_n=0.4$, $\omega_d=0.1 \cdot (2\pi)$ (rad/s), and $\zeta_d=0.15$, and has frequency characteristics shown in FIG. 3. With respect to the relative displacement voltage signal $e_D$ which is an output signal of the feedback control means 5 in which the phase advances at not more than a natural frequency $\omega_n$ shown in Expression (15), the phase lag compensation means 6 is adapted to perform phase lag compensation in a required frequency region so that the advance of the phase becomes zero in the detected range.

[Mathematical Formula 1]

$$G_c(s) = \frac{s^2 + 2\zeta_n \omega_n s + \omega_n^2}{s^2 + 2\zeta_d \omega_d s + \omega_d^2} \quad (1)$$

In the above-described absolute displacement sensor 1, if all are fed back negatively, the transfer function of the relative displacement voltage signal $e_D$ with respect to the absolute displacement u of the sensor housing 2 as the detection object is given by the following Expression (2):

[Mathematical Formula 2]

$$\frac{e_D}{u} = \frac{mK_a(T_A s + 1)s^3}{a_0 s^4 + a_1 s^3 + a_2 s^2 + a_3 s + a_4} \quad (2)$$

In addition, the transfer function of the relative velocity voltage signal $e_V$ with respect to the absolute displacement u is given by the following Expression (3):

[Mathematical Formula 3]

$$\frac{e_V}{u} = \frac{mK_a\{T_D T_A s^2 + (T_D + T_A)s + 1\}s^3}{a_0 s^4 + a_1 s^3 + a_2 s^2 + a_3 s + a_4} \quad (3)$$

In Expressions (2) and (3), the coefficients $a_0$, $a_1$, $a_2$, $a_3$, and $a_4$ are expressed by the following Expressions (4) to (8):

[Mathematical Formula 4]

$$a_0 = T_D T_A m \quad (4)$$

$$a_1 = (T_D + T_A)m + T_D T_A c + T_D T_A K_a K_f(K_A + K_V) \quad (5)$$

$$a_2 = m + (T_D + T_A)c + T_D T_A k + T_A T_a K_f(K_V + K_D + K_A) \quad (6)$$

$$a_3 = (T_D + T_A)k + c + K_a K_f(K_D + K_V) \quad (7)$$

$$a_4 = k \quad (8)$$

Here, $T_D$ is a time constant of the integration circuit 15, and $T_A$ is a time constant of the differentiation circuit 16. A transfer function $G_D(s)$ of the integration circuit 15 is given by the following Expression (9):

[Mathematical Formula 5]

$$G_{D(s)} = \frac{1}{T_D s + 1} \quad (9)$$

If $T_D$ is large, $T_D s \gg 1$, so that the transfer function $G_D(s)$ is given by the following Expression (10):

[Mathematical Formula 6]

$$G_{D(s)} = \frac{1}{T_D s} \quad (10)$$

A transfer function $G_A(s)$ of the differentiation circuit 16 is given by the following Expression (11):

[Mathematical Formula 7]

$$G_{A(s)} = \frac{T_A s}{T_A s + 1} \quad (11)$$

In a range in which s is small, $T_A s \ll 1$, so that the transfer function $G_A(s)$ is given by the following Expression (12):

[Mathematical Formula 8]

$$G_{A(s)} = T_A s \quad (12)$$

From Expressions (10) and (12), the transfer function of the relative displacement voltage signal $e_D$ with respect to the absolute displacement u can be expressed by the following Expression (13):

[Mathematical Formula 9]

$$\frac{e_D}{u} = \frac{mK_a s^2}{T_D(m + T_A K_a K_f K_A)s^2 + T_D(c + K_a K_f K_V)s + T_D k + K_a K_f K_D} \quad (13)$$

$$= \frac{mK_a s^2}{s^2 + \frac{T_D(c + K_a K_f K_V)}{T_D(m + T_A K_a K_f K_A)}s + \frac{T_D k + K_a K_f K_D}{T_D(m + T_A K_a K_f K_A)}}$$

Similarly, from Expressions (10) and (12), the transfer function of the relative velocity voltage signal $e_V$ with respect to the absolute displacement u can be expressed by the following Expression (14):

[Mathematical Formula 10]

$$\frac{e_V}{u} = \frac{mK_a T_D s^3}{T_D(m + T_A K_a K_f K_A)s^2 + T_D(c + K_a K_f K_V)s + T_D k + K_a K_f K_D} \quad (14)$$

If the natural frequency $\omega_n$ and the damping ratio $\zeta$ are determined from Expression (13), the following Expressions (15) and (16) are given:

[Mathematical Formula 11]

$$\omega_n = \sqrt{\frac{k + \frac{1}{T_D} K_a K_f K_D}{m + T_A K_a K_f K_A}} \quad (15)$$

$$\zeta = \frac{c + K_a K_f K_V}{2\sqrt{(m + T_A K_a K_f K_A)\left(k + \frac{1}{T_D} K_a K_f K_D\right)}} \quad (16)$$

Figure 4:
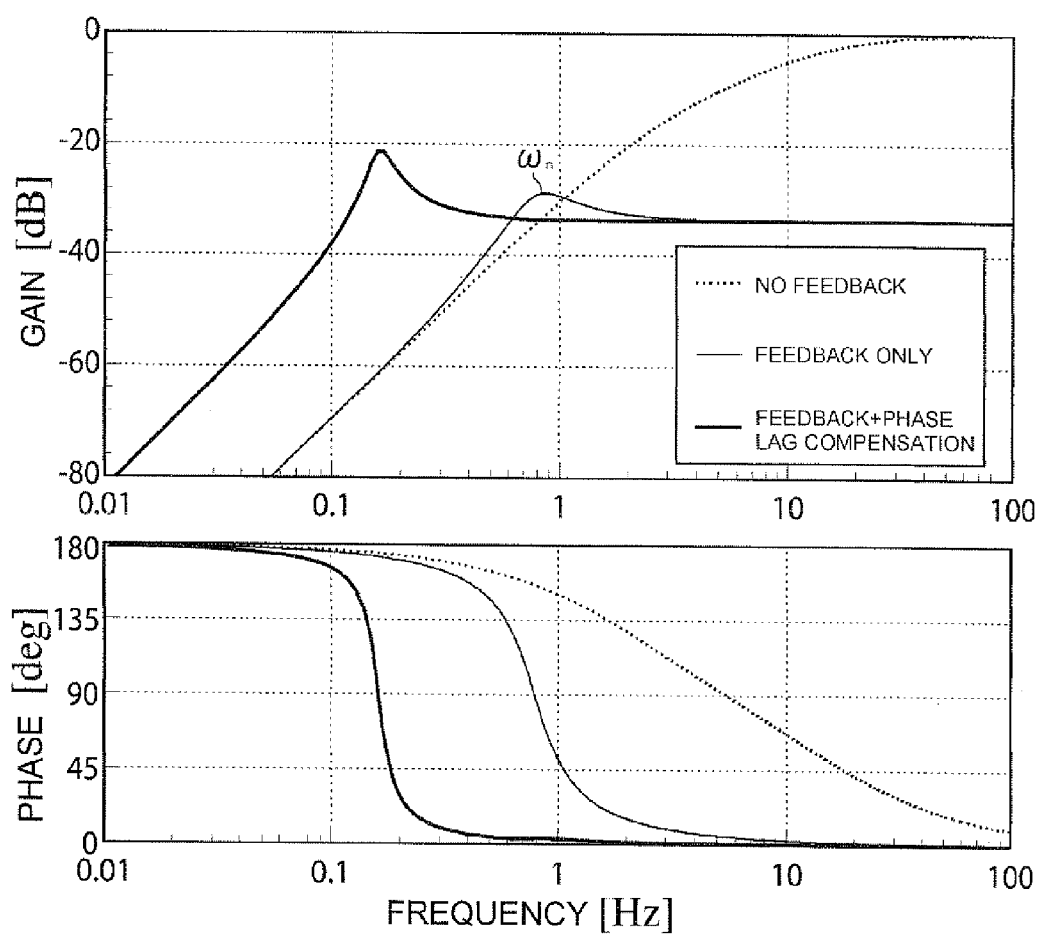
FIG. 4 is an explanatory diagram of the frequency characteristics of the embodiment shown in FIG. 1.

The transfer function of the absolute displacement u of the sensor housing 2 attributable to the relative displacement u−x of the sensor housing 2 is given by the Expression (17) below. The frequency response characteristics expressing this Expression (17) are given in a gain-phase diagram with feedback only in FIG. 4. In FIG. 4, $\omega_n$ is determined by Expression (15), and a peak value of its frequency is determined by Expression (16). Without feedback, which is indicated by the dotted line, the gain is 0 dB, but in the case of feedback only, which is indicated by the narrow solid line, the gain dropped to −34 dB at a frequency of $\omega_n$ or higher. However, at 1 Hz, the phase advanced 45°, and the measurement range of the sensor for measuring the displacement becomes approximately 2 Hz or higher. It is the phase lag compensation means 6 that expands this measurement range to an extremely low frequency. Namely, by causing $\omega_n$ in FIG. 4 and $\omega_n$ in FIG. 3 to agree with each other, the phase at 1 Hz is set to 0°, and the phase down to 0.2 Hz or thereabouts is set to the vicinity of 0°.

[Mathematical Formula 12]

$$\frac{u - x}{u} = \frac{m T_D s^2}{T_D(m + T_A K_a K_f K_A)s^2 + T_D(c + K_a K_f K_V)s + T_D k + K_a K_f K_D} \quad (17)$$

The range of detection of the absolute displacement u by the absolute displacement sensor 1 is a region in which the frequency is the natural frequency $\omega_n$ or higher and in which the magnitude (gain) of the transfer function (u−x)/u becomes constant. Accordingly, the terms which are affected at the natural frequency $\omega_n$ or higher in Expression (17) are those of $s^2$ in both the numerator and the denominator, the transfer function (u−x)/u and the detected relative displacement (u−x) at the natural frequency $\omega_n$ or higher are given by the following Expression (18):

[Mathematical Formula 13]

$$\frac{u - x}{u} = \frac{m}{m + T_A K_a K_f K_A} \quad (18)$$

$$u - x = h = \frac{m}{m + T_A K_a K_f K_A} u$$

The relationship between, on the one hand, a detectable amplitude (detectable maximum amplitude) H (=Max·(u−x)) which can be detected by the absolute displacement sensor 1 due to such as structural requirements inside the absolute displacement sensor 1 and, on the other hand, a detectable amplitude (detectable maximum amplitude) U (=Max·u) of the sensor housing 2 which can be detected by the absolute displacement sensor 1, is given by Expression (19):

[Mathematical Formula 14]

$$H = \frac{m}{m + T_A K_a K_f K_A} U \quad (19)$$

As is apparent from the above-described analysis of the absolute displacement sensor 1, in Expression (15), as the relative displacement feedback gain $K_D$ is varied, (k+1/$T_D \cdot K_a \cdot K_f \cdot K_D$) in the numerator term varies. Here, since $1/T_D$, $K_a$, and $K_f$ are positive, the numerator term becomes (k−1/$T_D \cdot K_a \cdot K_f \cdot K_D$) and small owing to the positive feedback of the relative displacement (u−x) (it should be noted that, in the negative feedback of the relative displacement (u−x), the numerator term in Expression (15) becomes (k+1/$T_D \cdot K_a \cdot K_f \cdot K_D$)).

In addition, in Expression (15), as the relative acceleration feedback gain $K_A$ is varied, (m+$T_A \cdot K_a \cdot K_f \cdot K_A$) in the denominator term varies. Here, since $T_A$, $K_a$, and $K_f$ are positive, the denominator term (m+$T_A \cdot K_a \cdot K_f \cdot K_A$) becomes large owing to the negative feedback of the relative acceleration a (it should be noted that, in the positive feedback of the relative acceleration a, the denominator term becomes (m−$T_A \cdot K_a \cdot K_f \cdot K_A$)).

Accordingly, in the absolute displacement sensor 1, since the relative displacement (u−x) is fed back positively, and the relative acceleration a is fed back negatively, it is possible to lower the natural frequency $\omega_n$ without causing a structural defect.

In addition, with the absolute displacement sensor 1, as is apparent from Expression (19), since the relative acceleration a is fed back negatively, and ($T_A \cdot K_a \cdot K_f \cdot K_A$) is hence adapted to become positive, even if the detectable amplitude H is small, it is possible to detect a large absolute displacement u of the sensor housing 2, i.e., it is possible to enlarge the detectable amplitude U of the absolute displacement sensor 1.

Furthermore, with the absolute displacement sensor 1, the feedback of the relative velocity v affects only the damping ratio $\zeta$, and, in Expression (16), as the velocity feedback gain $K_V$ of the relative velocity v is varied, (c+$K_a \cdot K_f \cdot K_V$) in the numerator term is adapted to vary. Here, since $K_a$ and $K_f$ are positive coefficients, the relative velocity v is fed back negatively, as described above, so that (c+$K_a \cdot K_f \cdot K_V$) becomes large, and the damping ratio $\zeta$ also becomes large. If the relative velocity v is fed back positively, the numerator term in Expression (16) becomes (c−$K_a \cdot K_f \cdot K_V$), making it possible to make the damping ratio $\zeta$ small by the positive feedback of the relative velocity v.

In addition, since the absolute displacement sensor 1 is provided with the phase lag compensation means 6 for performing phase lag compensation with respect to the relative displacement (u−x) obtained by integration, it is possible to overcome a phase advancement in the vicinity of the natural frequency $\omega_n$ of the transfer function (u−x)/u shown by Expression (17). Thus, it is possible to lower the natural frequency $\omega_n$, and even with a structure whose natural frequency is extremely low, its absolute displacement can be detected satisfactorily.

Incidentally, with the absolute displacement sensor 1 using the phase lag compensation means 6 shown in FIG. 2, as is also apparent from the characteristic diagram of feedback plus phase lag compensation, indicated by the thick solid line, of the frequency response characteristics in FIG. 4, detection down to 0.2 Hz is possible. Moreover, since the gain is lowered to −34 dB, it becomes possible to detect a 50-fold displacement. For instance, even if the movable amount of the mass body 3 is 1 mm, it becomes possible to detect the absolute displacement of 50 mm, so that miniaturization can be achieved.

Accordingly, with the absolute displacement sensor 1 which implements an absolute displacement detection method wherein detection is made of the relative velocity v of the sensor housing 2 with respect to the mass body 3 supported by the sensor housing 2 serving as the detection object with the spring coefficient k and the damping coefficient c, the absolute displacement x of the mass body 3 attributable to the absolute displacement u of the sensor housing 2 is controlled by positively feeding back the relative displacement (u−x) obtained by integrating the detected relative velocity v, by negatively feeding back the relative acceleration a obtained by primarily differentiating the detected relative velocity v, and by negatively feeding back the detected relative velocity v, respectively, and wherein phase lag compensation is performed with respect to the relative displacement (u−x) obtained by the integration, the relative displacement (u−x) subjected to phase lag compensation and the detected relative velocity v of the sensor housing 2 can be outputted and obtained respectively from the output terminals 31 and 32 by electrical signals as a substantive absolute displacement and absolute velocity.

In addition, with the absolute displacement sensor 1, since the relative velocity v of the sensor housing 2 with respect to the mass body 3 is electrically detected by the detecting means 4, and the relative displacement (u−x) is obtained by integrating the relative velocity v detected by the detecting means 4, it is possible to circumvent the effect of drift caused by a dc component as compared with an absolute displacement sensor in which the relative displacement (u−x) is directly detected electrically.

With the absolute displacement sensor 1, the relative acceleration voltage signal $e_A$ (V) of the differentiation circuit 16 may be outputted and obtained as the absolute acceleration.

The invention claimed is:

1. An absolute displacement detection method comprising the steps of:
   detecting a relative velocity of a detection object with respect to a mass body supported by the detection object with a predetermined spring coefficient and a predetermined damping coefficient;
   controlling the displacement of said mass body attributable to an absolute displacement of the detection object by a closed feedback loop including the steps of positively feeding back a relative displacement obtained by integrating the detected relative velocity and negatively feeding back a relative acceleration obtained by primarily differentiating the detected relative velocity, respectively; and
   obtaining the absolute displacement of the detection object from a relative displacement in which the relative displacement obtained by the integration is subjected to phase lag compensation in a required frequency region including a natural frequency of the closed feedback loop to make a phase lead into zero in a detection region within which the absolute displacement of the detection object is detected.

2. The absolute displacement detection method according to claim 1, wherein the displacement of said mass body attributable to the absolute displacement of the detection object is controlled by negatively or positively feeding back the detected relative velocity.

3. An absolute displacement sensor comprising: a mass body which is supported by a detection object with a predetermined spring coefficient and a predetermined damping coefficient; detecting means which detects a relative velocity of the detection object with respect to said mass body; a closed feedback loop having a feedback control means which controls a displacement of said mass body attributable to an absolute displacement of the detection object by positively feeding back a relative displacement obtained by integrating the detected relative velocity and by negatively feeding back a relative acceleration obtained by primarily differentiating the detected relative velocity, respectively; and phase lag compensation means which performs phase lag compensation in a required frequency region including a natural frequency of the closed feedback loop with respect to the relative displacement obtained by the integration to make a phase lead into zero in a detection region within which the absolute displacement of the detection object is detected, wherein the relative displacement subjected to the phase lag compensation by said phase lag compensation means is outputted as the absolute displacement of the detection object.

4. The absolute displacement sensor according to claim 3, wherein said feedback control means is adapted to control the displacement of said mass body attributable to the absolute displacement of the detection object by further negatively or positively feeding back the detected relative velocity.

5. An active dynamic vibration absorber which is adapted to absorb vibrations of a vibrating body on the basis of the absolute displacement which is outputted from the absolute displacement sensor according to claim 3.

* * * * *